United States Patent [19]

Zhong et al.

[11] Patent Number: 5,684,105
[45] Date of Patent: Nov. 4, 1997

[54] PROCESS FOR PROVIDING HOMOGENEOUS COPOLYMERS OF VINYLPYRROLIDONE AND 3-DIMETHYLAMINOPROPYL METHACRYLAMIDE (DMAPMA) WHICH FORM CLEAR AQUEOUS SOLUTIONS HAVING HIGH CLOUD POINTS

[75] Inventors: Yuanzhen Zhong, Wayne; Philip F. Wolf, Bridgewater, both of N.J.

[73] Assignee: ISP Investments Inc., Wilmington, Del.

[21] Appl. No.: 685,366

[22] Filed: Jul. 23, 1996

[51] Int. Cl.$^6$ .......................... C08F 226/10; C08F 226/60
[52] U.S. Cl. .............................. 526/264; 526/307
[58] Field of Search ...................... 526/264, 307

[56] References Cited

U.S. PATENT DOCUMENTS 4,923,694   5/1990   Shih et al. .................................. 424/70
5,523,369   6/1996   Lui et al. .................................. 526/264

OTHER PUBLICATIONS

Fred W. Billmeyer, Jr. Textbook of Polymer Science, 3rd. ed., John Wiley & Sons, 1984, pp. 112–114.

*Primary Examiner*—Joseph L. Schofer
*Assistant Examiner*—Wu C. Cheng
*Attorney, Agent, or Firm*—Walter Katz; Marilyn J. Maue; Joshua J. Ward

[57] ABSTRACT

A process for making homogeneous copolymers of vinylpyrrolidone (VP) and 3-dimethylaminopropyl methacrylamide (DMAPMA) which form clear aqueous solutions having high cloud points. The process involves precharging VP and DMAPMA monomers in a predetermined ratio, and then feeding VP and DMAPMA at a predetermined rate, the ratio of the components in the initial charge and the feeding rates for the monomer being selected in accordance with the reactivity rates of the monomers towards copolymerization as opposed to homopolymerization.

10 Claims, No Drawings

PROCESS FOR PROVIDING HOMOGENEOUS COPOLYMERS OF VINYLPYRROLIDONE AND 3-DIMETHYLAMINOPROPYL METHACRYLAMIDE (DMAPMA) WHICH FORM CLEAR AQUEOUS SOLUTIONS HAVING HIGH CLOUD POINTS

FIELD OF THE INVENTION

This invention relates to a process for making copolymers of vinylpyrrolidone (VP) and 3-dimethylaminopropyl methacrylamide (DMAPMA), and, more particularly, to homogeneous copolymers of VP and DMAPMA which can form clear aqueous solutions having high cloud points.

DESCRIPTION OF THE INVENTION

Copolymers of vinylpyrrolidone (VP) and 3-dimethylaminopropyl methacrylamide (DMAPMA) monomers have significant utility in the pharmaceutical and cosmetic industries. Generally, these copolymers are prepared by a batch process in which selected amounts of the vinylpyrrolidone and 3-dimethylaminopropyl methacrylamide monomers are charged in water as solvent and tert-butyl peroxypivalate (Lupersol 11) as initiator and heated to a reaction temperature for several hours. For these uses, however, it is necessary that the copolymer be present as clear aqueous solutions. This property is characteristic of a copolymer having a substantially homogeneous structure.

Homogeneous copolymers of VP and DMAPMA are difficult to prepare because DMAPMA is a significantly more reactive monomer during the polymerization than the VP monomer. Accordingly, DMAPMA monomer will react faster and go into the copolymer chains first as DMAPMA units. At the beginning of copolymerization reaction (low conversion), a DMAPMA-enriched copolymer with DMAPMA blocks is generated. As conversion increases, the concentration of DMAPMA decreases and the VP concentration increases, the rate of VP entering the copolymer becomes faster, and a VP-enriched copolymer (possible containing VP blocks) is generated. At high conversion, most DMAPMA is consumed, VP homopolymer is generated. Therefore a heterogeneous polymer mixture is produced.

Since VP is a highly hydrophilic monomer and DMAPMA is not, the presence of DMAPMA-enriched components in the heterogeneous copolymer will reduce its water solubility appreciably. The resultant copolymer thus will appear cloudy in water solution. Such cloudy solutions are indicative of polymers having a low cloud point, i.e. they appear cloudy at room temperature.

Accordingly, it is an object of this invention to provide a process for making homogeneous copolymers of vinylpyrrolidone and 3-dimethylaminopropyl methacrylamide monomers of predetermined composition at high conversions, which form clear aqueous solutions at temperatures above room temperature, indicating the polymer solutions have high upper cloud points.

Another object herein is to provide VP/DMAPMA copolymers of predetermined compositions by precharging and feeding the two monomers in amounts and at individual rates which are predetermined by their respective reactivities towards copolymerization as opposed to homopolymerization.

These and other objects and features of the invention will be made apparent from the following more particular description of the invention.

SUMMARY OF THE INVENTION

A process is described for making homogeneous copolymers of vinylpyrrolidone (VP) and 3-dimethylaminopropyl methacrylamide (DMAPMA), which can form clear aqueous solutions at room temperature. The process involves precharging VP and DMAPMA monomers in a predetermined ratio and then feeding VP and DMAPMA at a predetermined rate, the ratio of the components in the initial charge and the feeding rates for the monomers being selected in accordance with the reactivity ratios of the monomers towards copolymerization as opposed to homopolymerization.

DETAILED DESCRIPTION OF THE INVENTION

VP and DMAPMA are monomers with quite different properties. VP is a highly hydrophilic monomer and DMAPMA is not. A heterogeneous copolymer with DMAPMA-enriched components is insoluble in water and the aqueous solution appears hazy. In addition, the homogeneity of the structure of the copolymer is also important to its application. For example, at the end of polymerization, part of the DMAPMA units will react with acid to be quaternized and form quaternary ammonium salt. When dissolved in water, the polyquaternium will be ionized and form positive charges. Since human hairs are negatively charged, the VP and DMAPMA copolymer will form complexes with hairs and form a uniform thick film on keratin, that is the reason why a VP-DMAPMA copolymer is used in hair care products. For such applications, the DMAPMA units should be distributed homogeneously along the macromolecular chains. Any substantial amount of VP blocks, DMAPMA blocks, VP-enriched components, or DMAPMA-enriched components therein will deteriorate the performance of the copolymer.

The reactivities of VP and DMAPMA monomers towards copolymerization, as opposed to homopolymerization, also are quite different. Using the values of Q (a measure of the resonance stabilization) and e (a measure of polar property) of these monomers, the reactivity ratios r (defined as the reaction rate towards copolymerization as opposed to homopolymerization) of VP and DMAPMA monomers can be calculated.

The Q and e values for DMAPMA are not available in literature, but they can be derived as below. The reactivity ratios for DMAPMA and styrene are given in the literature (Technical Brochure issued by Rohm Tech Inc. entitled Aminofunctional Acrylates and Methacrylates Monomers) as following:

| Monomer Activity Ratios | | |
|---|---|---|
| | $r_1$ | $r_2$ |
| DMAPMA | 0.30 | |
| Styrene | | 1.90 |

The Q and e values for styrene are defined as follows:

| | Q | e |
|---|---|---|
| Styrene: | 1.00 | −0.80 |

The following Price-Alfrey Equations relate the activity ratios, $r_1$ and $r_2$ to the Q and e values as follows:

$$r_1 = \frac{Q_1}{Q_2} \exp[-e_1(e_1 - e_2)]$$

$$r_2 = \frac{Q_2}{Q_1} \exp[-e_2(e_2 - e_1)]$$

From the above equations, the Q and e values for DMAPMA can be calculated as follows:

|  | Q | e |
|---|---|---|
| DMAPMA: | 0.96 | −1.55 |

The Q and e values for VP are available in the literature (G. Odian, Principles of Polymerization, 3rd Ed., John Wiley & Sons, 1992, New York) as follows:

|  | Q | e |
|---|---|---|
| VP: | 0.088 | −1.62 |

Using the Q and e values for VP and DMAPMA, and the Price-Alfrey Equations, the monomer activity ratios, $r_1$ and $r_2$ can be obtained as follows:

| | Monomer Reactivity Ratios | |
|---|---|---|
| | $r_1$ | $r_2$ |
| VP | 0.082 | |
| DMAPMA | | 12.14 |

These $r_1$ and $r_2$ values indicate that DMAPMA is much more reactive towards polymerization than VP. Accordingly, DMAPMA monomer will enter copolymer chains faster than VP monomer. Thus, in a batch process, where both monomers are added at the beginning of the copolymerization reaction, the DMAPMA monomer will react first leaving VP monomer to react later. DMAPMA homopolymer thereby will be made at the beginning of the process and VP homopolymer will be made at the end of the process. The resultant copolymer will be heterogeneous with large DMAPMA blocks therein, which will generate phase separation in water, and make the copolymer appear hazy in aqueous solution.

In this invention, in contrast to batch processes, homogeneous copolymers are prepared by precharging the monomers in a defined ratio, and then gradually feeding larger amounts of the more reactive monomer to the reaction mixture according to the following copolymerization equations:

$$F_1 = \frac{r_1 f_1^2 + f_1 f_2}{r_1 f_1^2 + 2 f_1 f_2 + r_2 f_2^2} \quad (1)$$

$$F_2 = \frac{r_2 f_2^2 + f_1 f_2}{r_1 f_1^2 + 2 f_{12} + 2 f_1 f_2 + r_2 f_2^2} \quad (2)$$

where
$F_1$: mole fraction of monomer 1 in the copolymer;
$F_2$: mole fraction of monomer 2 in the copolymer;
$r_1$: reactivity ratio for monomer 1;
$r_2$: reactivity ratio for monomer 2;
$f_1$: mole fraction of monomer 1 in the feed;
$f_2$: mole fraction of monomer 2 in the feed.

These equations give the instantaneous copolymer composition, and the mole fraction of monomer 1 and monomer 2 in the copolymer ($F_1$ and $F_2$), when the feed compositions ($f_1$ and $f_2$) and monomer reactivity ratios ($r_1$ and $r_2$) are known.

For a P(VP/DMAPMA) copolymer having a monomer weight ratio of 80:20, i.e. a mole ratio of 86:14, the monomer mole fractions in the copolymer are $F_1=0.86$ and $F_2=0.14$. However, these values are the overall mole fraction in the copolymer product when the copolymerization reaction is completed. In order to obtain a homogeneous product, the instantaneous $F_1$ and $F_2$ values during the entire polymerization process should be substantially the same as these overall values. The instantaneous $F_1$ and $F_2$ values, in turn, depend upon the instantaneous monomer mole fractions in the feeds, i.e. $f_1$ and $f_2$.

$F_1$ and $F_2$ can be used to calculate $f_1$ and $f_2$, as follows:
Rearranging equations (1) and (2) above, the following equation (3) for $f_1/f_2$ can be obtained.

$$\frac{f_1}{f_2} = \frac{(F_1 - F_2) + [(F_2 - F_1)^2 + 4 F_1 F_2 r_1 r_2]^{1/2}}{2 F_2 r_1} \quad (3)$$

and, since, from definition, we have:

$$f_1 + f_2 = 1 \quad (4)$$

$f_1$ and $f_2$ then can be calculated directly from the $F_1$ and $F_2$ values. For example, in a copolymer having a 80:20 weight ratio, the mole fractions in the copolymer are $F_1=0.86$ and $F_2=0.14$. The corresponding mole fractions of monomers in the feeds, $f_1$ and $f_2$, then must be:

$f_1=0.987$ (97.99% by weight);

$f_2=0.013$ (2.01% by weight); and $f_1/f_2=74.7$ by weight.

Accordingly, in the process herein, the mole fractions of the VP and DMAPMA monomers in the initial charge (precharge) are the $f_1$ and $f_2$ values calculated from the above equations. After copolymerization commences, however, the individual monomers are continuously fed into the precharge composition based upon their respective consumption ratio. Theoretically, this consumption ratio should be 80/20 by weight; however it can be determined experimentally during polymerization as follows:

GC samples of the polymerization mixture are taken to determine the amounts of residual monomers present in the mixture, i.e. the amounts of VP and DMAPMA unreacted. Since the amounts of VP and DMAPMA added are known, the amounts and ratio of VP and DMAPMA reacted into copolymer then can be calculated by difference. This VP/DMAPMA ratio reacted should be as close as possible to the ideal ratio of 80/20 by weight in the final product.

The example given below demonstrates that the process according to the invention generated homogeneous PVP/DMAPMA copolymers with controlled monomer distribution in the polymer chains.

The solvent for polymerization during the process according to the invention can be either alcohol (i.e. methanol, ethanol or isopropanol) or water, or a mixture of alcohol and water; (the water content can range from 0% to 100% by weight based on the total amount of solvent).

The process according to the invention is illustrated below by the preparation of VP/DMAPMA copolymers comprising (a) 5% to 95% by weight VP and (b) 5% to 15% by weight DMAPMA, having number average molecular weights of about 50,000 to about 2,000,000, respectively, dependent upon the polymer content.

The overall process according to the invention preferably consists of the following several steps:
(A) Polymerization (discussed above);
(B) Post-treatment (to reduce residual monomers to less than 100 ppm);
(C) Solvent exchange (to replace any organic solvent by water);
(D) Drying (to obtain the product in powder form if desired).

While the example given below describes VP/DMAPMA copolymers in a VP and DMAPMA weight ratio of 80:20, the process of the invention can be used to make any homogeneous copolymer of predetermined composition from monomers having different reactivity activities.

EXAMPLE

A. Copolymerization
B. Post-Treatment

A 1-liter Buchi reactor is purged with nitrogen and the initial charge (Heel) is pumped into the reactor. The reactants are stirred at 150 rpm and heated to 60° C. Then Feeds 1 and 2 are introduced simultaneously. After addition of Feed 1 is finished, Feed 3 is started immediately. After addition of Feeds 2 and 3 are completed, the batch is held at 60° C. for 2 hours. Then the temperature is raised to 75° C. to start a post-treatment stage. Feed 4 is added to dilute the system to 10%. After Feed 4 is completed the temperature is held at 75° C. for 5 hours. The mixture is neutralized by adding sulfuric acid at 50° C., followed by 2 hours nitrogen sparge. Then the reactor is cooled down and the intermediate product (a 10% solution in water) is discharged.

The process of the Example is summarized below:

|  | Heel | Feed 1 | Feed 2 | Feed 3 | Feed 4 |
|---|---|---|---|---|---|
| Time (hour) | — | 3.5 | 5.0 | 1.0 | 1.5 |
| Chemicals (gms) |  |  |  |  |  |
| VP | 11.2 | 44.8 | — | — | — |
| DMAPMA | 0.23 | 11.2 | — | 2.57 | — |
| Lupersol 11* | 0.042 | — | 0.168 | — | — |
| V-501** | — | — | — | — | 0.21 |
| Water | 64.77 | 31.0 | 7.30 | 14.56 | 233.37 |

*Lupersol 11: is t-butyl peroxypivalate-75% in odorless mineral spirits.
**V-501: is 4,4'-azobis(4-cyanovaleric acid), cps #: 2638-94-0.

The polymerization concentration is 15%, with 18% DMAPMA in Feed 3; and 0.15% of each initiator (based on the weight of total batch) is used. The amount of the initial charge is 10.9%, by weight of the total batch.

C. Solvent Exchange (not necessary when water is used as reaction solvent, necessary when alcohol is used as part of solvent or the only solvent).

D. Drying

The aqueous solution is frozen and dried to provide the copolymer product in powder form.

The product is a white powder, without odor, free of haze in 10% aqueous solution, free of haze in 2% ethanol solution, and a residual VP and DMAPMA content below 100 ppm.

While the invention has been described with particular reference to certain embodiments thereof, it will be understood that changes and modifications may be made which are within the skill of the art. Accordingly, it is intended to be bound only by the following claims, in which:

What is claimed is:

1. A process for making substantially homogeneous copolymers of vinylpyrrolidone and 3-dimethylaminopropyl methacrylamide having a selected weight ratio of 5:95 to 95:1 which form clear aqueous solutions having a high cloud point substantially in excess of room temperature by polymerization of the monomers in water, a water miscible organic solvent, and mixtures thereof, in the presence of a radical initiator, which comprises:

(a) precharging a reactor with initial weight amounts of vinylpyrrolidone ($f_1$) and of 3-dimethylaminopropyl methacrylamide ($f_2$) monomers according to the equation $$\frac{f_1}{f_2} = \frac{(F_1 - F_2) + [(F_2 - F_1)^2 + 4F_1 F_2 r_1 r_2]^{1/2}}{2F_2 r_1}$$

wherein
$f_1$: mole fraction of monomer 1 in the feed;
$f_2$: mole fraction of monomer 2 in the feed;
$F_1$: mole fraction of monomer 1 in the copolymer;
$F_2$: mole fraction of monomer 2 in the copolymer;
$r_1$: reactivity ratio for monomer 1 and
$r_2$: reactivity ratio for monomer 2;

to provide said selected weight ratio of monomers, solvent and initiator, at a polymerization temperature, and (b) introducing separate feed streams of vinylpyrrolidone and 3-dimethylaminopropyl methacrylamide monomers, solvent and initiator into said reactor at given rates, according to the selected monomer ratio in said copolymer, over a given period of time.

2. A process according to claim 1 wherein said weight ratio of said copolymer is about 80/20.

3. A process according to claim 1 wherein the initial precharge has a concentration of 5–30% by weight of the total batch.

4. A process according to claim 1 wherein the monomer concentration is about 5–30% by weight.

5. A process according to claim 1 wherein the copolymer obtained has a number average molecular weight of 50,000–2,000,000.

6. A process according to claim 1 which also includes the steps of post-heating to reduce residual monomers to 100 ppm, and solvent-exchange to replace organic solvent with water.

7. A process according to claim 6 which also includes the steps of drying the aqueous solution to provide the copolymer as a powder.

8. A process according to claim 1 wherein the initiator is t-butyl peroxypivalate, or t-amyl peroxypivalate, or 4,4'-azobis(4-cyanovaleric acid), or 2,2'-azobis-2-methylbutane nitrile, or mixtures thereof.

9. A process according to claim 1 wherein the separate feeding rates of vinylpyrrolidone and 3-dimethylaminopropyl methacrylamide is about 4.0:1 by weight, which provides a vinylpyrrolidone to 3-dimethylaminopropyl methacrylamide conversion ratio, during polymerization, by weight, of about 4.0.

10. A process according to claim 9 wherein the weight ratio of vinylpyrrolidone to 3-dimethylaminopropyl methacrylamide in the initial charge is about 98.0 to 2.0, respectively.

* * * * *